United States Patent Office 3,069,437
Patented Dec. 18, 1962

3,069,437
21-FLUORO-17-OXYGENATED-PREGNANE DERIVATIVES
Raymond L. Pederson, Kalamazoo, and John C. Babcock, Portage Township, Kalamazoo, Mich., assignors to The Upjohn Company, Kalamazoo, Mich., a corporation of Michigan
No Drawing. Filed May 15, 1958, Ser. No. 735,380
2 Claims. (Cl. 260—397.45)

This invention relates to novel 21-fluorinated steroids, and has among its objects the provision of the novel 21-fluorinated compounds, 21-fluoro-17α-hydroxyprogesterone, 9(11)-dehydro-21-fluoro - 17α - hydroxyprogesterone and their 17α-acylates and 3,17α-diacylates. Other objects will be apparent to those skilled in the art to which this invention pertains.

The novel 21-fluoro-17α-hydroxyprogesterone, 9(11)-dehydro-21-fluoro-17α-hydroxyprogesterone and their 17α-acylates and 3,17α-diacylates possess a high order of physiological activity, particularly oral and parenteral progestational activity. In addition they have marked antiinflammatory, central nervous system depressing, water and mineral regulating and anabolic and anti-estrogenic activity. The 9(11)-dehydro compounds are especially useful as progestational agents being ten to twenty times as active as progesterone, and they are active when administered orally or parenterally.

These compounds affect the secretion of gonadotropins and thus regulate ovulation and endometrial and placental development and, particularly when used in conjunction with "estrogens," e.g., "ethinylestradiol" and/or "androgens," e.g., "Halotestin" (9α-fluoro - 11β - hydroxy-17-methyl-testosterone) reduce fertility, and constitute effective therapy for dysmenorrhea, amenorrhea, endometriosis, threatened abortion and related gynecological disorders.

Administration of the compounds of this invention can be in conventional dosage forms, such as pills, tablets, capsules, solutions, syrups or elixirs for oral use, or in liquid forms which are adaptable to the natural and synthetic steroid hormones for injectable products.

According to the present invention, the novel 21-fluoro-17α-hydroxyprogesterone (IVa) and its 17α-acylates (Va) and 3,17-diacylates (VIa) are prepared from the known 17α,21-dihydroxy-4-pregnene-3,20-dione (Ia). The starting steroid, 17α,21-dihydroxy-4-pregnene-3,20-dione (Ia) is treated with an organic sulfonyl halide such as methanesulfonyl chloride to produce 17α,21-dihydroxy-4-pregnene-3,20-dione 21-methanesulfonate (IIa), which is then reacted with an alkali metal iodide, e.g., sodium iodide to give 21-iodo-17α-hydroxy-4-pregnene-3,20-dione (IIIa). Treatment of 21-iodo-17α-hydroxy-4-pregnene-3,20-dione (IIIa) with silver fluoride is productive of the novel 21-fluoro-17α-hydroxy-4-pregnene-3,20-dione (IVa), which can be converted under esterification conditions by para-toluenesulfonic acid or concentrated sulfuric acid and an appropriate acid anhydride to its 17α-acylates (Va) and 3,17α-diacylates (VIa). For example, para-toluenesulfonic acid and acetic anhydride is productive of 21-fluoro-17α-acetoxy-4-pregnene-3,20-dione and 21-fluoro-3,17α-diacetoxy-3,5-pregnadien-20-one.

In a similar series of reactions the novel 21-fluoro-17α-hydroxy-4,9(11)-pregnadiene-3,20-dione (IVb) and its 17α-acylates (Vb) and 3,17α-diacylates (VIb) are prepared from 17α,21-dihydroxy-4,9(11)-pregnadiene-3,20-dione (Ib). The starting steroid, 17α,21-dihydroxy-4,9(11)-pregnadiene-3,20-dione (Ib) is obtained by treating the known 17α,21-dihydroxy-4,9(11)-pregnadiene-3,20-dione, 21-acetate (compound 3 of U.S. Patent 2,640,838) with potassium bicarbonate. For example, by reacting 17α,21-dihydroxy-4,9(11)-pregnadiene - 3,20 - dione (Ib) with methanesulfonyl chloride, 17α,21-dihydroxy-4,9(11)-pregnadiene-3,20-dione 21-methanesulfonate (IIb) is produced. Treatment of the thus-produced 17α,21-dihydroxy-4,9(11)-pregnadiene-3,20-dione 21 - methanesulfonate (IIb) with sodium iodide results in the formation of 21-iodo-17α-hydroxy - 4,9(11) - pregnadiene-3,20-dione (IIIb). Treatment of 21-iodo-17α-hydroxy-4,9(11)-pregnadiene-3,20-dione (IIIb) with silver fluoride is productive of the novel 21-fluoro-17α-hydroxy-4,9(11)-pregnadiene-3,20-dione (IVb), which can be converted by esterification catalysts such as concentrated sulfuric acid or para-toluenesulfonic acid and an appropriate acid anhydride to its 17α-acylates (Vb) and 3,17α-diacylates (VIb). For example, para-toluenesulfonic acid and acetic anhydride is productive of 21-fluoro-17α-acetoxy-4,9(11)-pregnadiene-3,20-dione (Vb) and 21-fluoro-3,17α-diacetoxy-3,5,9(11)-pregnatrien-20-one (VIb).

The 17 acylates and 3,17 diacylates of this invention represented by Formulae V and VI of the reaction scheme shown below which are preferred are those wherein the acyl radical is that of a hydrocarbon carboxylic acid of from one to twelve carbon atoms, inclusive.

The products and process of the present invention are shown by the following formulae and more specifically by the examples.

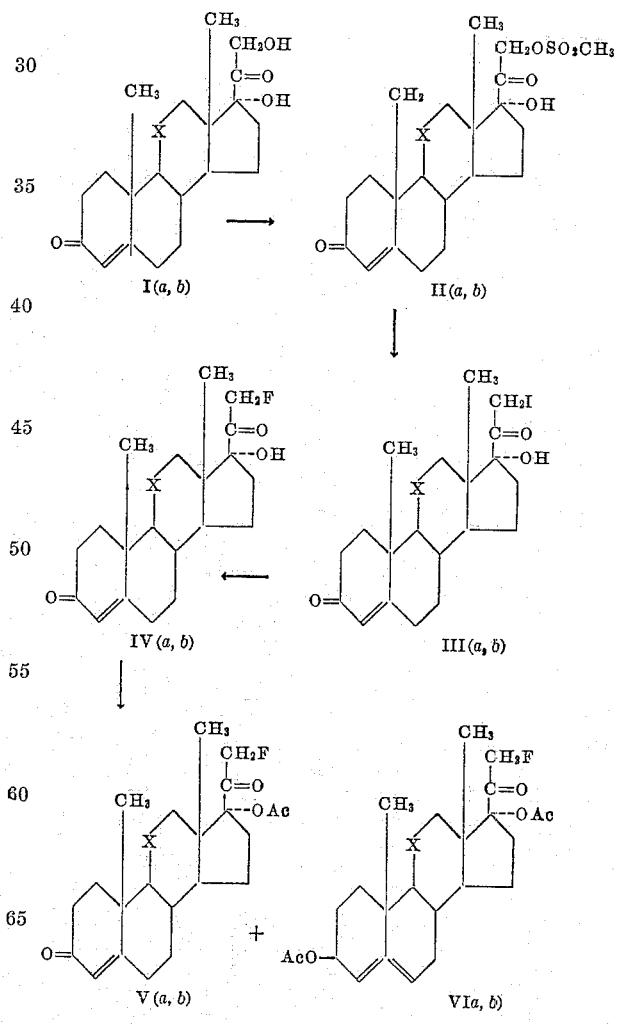

wherein Ac is an acyl radical of a hydrocarbon carboxylic acid containing from one to twelve carbon atoms, inclusive, and X is a single or double bond.

The compounds of the instant invention, 21-fluoro-17α-hydroxyprogesterone, 9(11)-dehydro-21-fluoro-17α-hydroxyprogesterone and their 17α-acylates and 3,17α-diacylates, are useful as starting material for other physiologically important compounds. For example, 21-fluoro-17α-hydroxyprogesterone can be converted microbiologically by *Cunninghamella blakesleeana* or *Abfidia glauca* to the 11β-hydroxy derivative, 21-fluoro-11β,17α-dihydroxy-4-pregnene-3,20-dione, which has marked glucocorticoid activity. 9(11)-dehydro-21-fluoro-17α-hydroxyprogesterone can be converted through the 9,11-oxide by the method of Fried [see J. Am. Chem. Soc., 75, 2273 (1953) and 76, 1455 (1954)] to the 9α-fluoro-11β-hydroxy derivative, 9α,21-difluoro - 11β,17α - dihydroxy-4-pregnene-3,20-dione, which also has pronounced glucocorticoid activity. In addition the enol acetates, 21-fluoro-3,17α-diacetoxy-3,5-pregnadien - 20 - one (VIa) and 21-fluoro-3,17α-diacetoxy-3,5,9(11)-pregnatrien-20-one (VIb) can be selectively hydrolyzed by refluxing them with boron trifluoride in methanol, gaseous hydrogen chloride in ethanol or aqueous potassium hydroxide in methanol to produce 21-fluoro-17α-acetoxy-4-pregnene-3,20-dione (Va) and 21-fluoro-17α-acetoxy-4,9-(11)-pregnadiene-3,20-dione (Vb).

The following examples are illustrative of the products and processes of the present invention, but are not to be construed as limiting.

*Example 1. — 17α,21-Dihydroxy-4-Pregnene-3,20-Dione 21-Methanesulfonate (IIa) (11-Desoxy-17α-Hydroxycorticosterone 21-Methanesulfonate)*

Twenty grams of 17α,21-dihydroxy-4-pregnen-3,20-dione (Ia) (the known 11-desoxy-17α-hydroxycorticosterone) was dissolved in 100 milliliters of pyridine and cooled to about zero degrees centigrade and 6.8 milliliters of methanesulfonyl chloride was added to the solution. This was accompanied by a rapid temperature rise to about 25 degrees centigrade. After a period of two hours of continuous cooling in an ice-bath, the mixture was diluted with 600 milliliters of cold water at which point precipitation occurred. Filtration of the crude solid yielded 20.5 grams with a melting point of 172 to 176 degrees centigrade. Recrystallization from acetone gave an analytical sample of 17α,21-dihydroxy - 4 - pregnen-3,20-dione 21-methanesulfonate (IIa) that melted at 183 to 185 degrees centigrade (decomposition).

*Analysis.*—Calculated for $C_{22}H_{32}O_6S$: S, 7.55. Found: S, 7.37, 7.53.

*Example 2.—21-Iodo-17α-Hydroxy-4-Pregnen-3,20-Dione (IIIa)*

18.5 grams of 17α,21-dihydroxy-4-pregnen-3,20-dione 21-methanesulfonate was dissolved in 260 milliliters of warm acetone. Nineteen grams of sodium iodide dissolved in 165 milliliters of acetone was added with stirring to the solution of the steroid. The reaction mixture was warmed under reflux with stirring for a period of fifteen minutes, then 200 grams of ice was added, followed by the addition of two grams of sodium thiosulfate dissolved in 500 milliliters of water. The precipitated solid that formed was filtered, washed with water and dried in vacuo at 25 degrees centigrade. The yield of 21-iodo-17α-hydroxy-4-pregnen-3,20-dione was 16.4 grams. It melted at 122 to 126 degrees (decomposition).

*Example 3.—21-Fluoro-17α-Hydroxy-4-Pregnen-3,20-Dione (IVa)*

14.4 grams of 21-iodo-17α-hydroxy-4-pregnen-3,20-dione (IIIa) was dissolved in 1400 milliliters of acetonitrile and shielded from daylight. Four 7.5 milliliter portions of fifty percent aqueous silver fluoride were added to the steroid with stirring at twenty minute intervals. The reaction mixture was warmed to about forty degrees centigrade and stirred an additional period of two hours. The reaction mixture was filtered through Celite (a diatomaceous earth filter aid) and the filtrate concentrated to dryness over a water bath heated to fifty degrees centigrade.

The residue was extracted with four 300 milliliter portions of methylene chloride and the combined extracts dried over anhydrous sodium sulfate. Evaporation of the solvent yielded thirteen grams of crystalline solid. This material was dissolved in 600 milliliters of methylene chloride and adsorbed on a 400 gram column of Florisil (a synthetic magnesium silicate). It was eluted with a mixture of acetone in Skellysolve B (hexane hydrocarbons) using 400 milliliter fractions, as follows:

Fractions 1 to 4 ——————————— 9 percent acetone.
Fractions 5 to 21 ——————————— 10 percent acetone.
Fractions 22 to 40 ——————————— 12 percent acetone.

Fractions 11 to 35, inclusive, weighing a total of 4.51 grams, were combined and dissolved in 300 milliliters of methylene chloride and fifty milliliters of methyl ethyl ketone. The solvent was evaporated until a volume of about forty milliliters remained, then the solution was cooled and 3.5 grams of crystalline 2-fluoro-17α-hydroxy-4-pregnen-3,20-dione (IVa) separated. It melted at 222 to 226 degrees centigrade and had a rotation of $[\alpha]_D$ plus 132 degrees (in chloroform). The infrared absorption spectrum showed a maximum at 1725 centimeters$^{-1}$ (mull) characteristic of α-halo ketones and the remainder of the spectrum supported this structure.

*Analysis.*—Calculated for $C_{21}H_{29}FO_3$: C, 72.38; H, 8.39; F, 5.45. Found: C, 72.13; H, 8.42; F, 5.32.

The combined chromatographic fractions 4 and 5 weighed 1.46 grams. This material was crystallized from acetone to yield one gram of 17α,21-epoxy-4-pregnen-3,20-dione with a melting point of 194 to 198 degrees centigrade, a rotation of $[\alpha]_D$ plus 216 degrees (in chloroform) and a negative Beilstein test for halogen. The infrared absorption spectrum showed the absence of hydroxyl absorption and the presence of a strained ring ketone absorption at 1805 centimeters$^{-1}$.

*Analysis.*—Calculated for $C_{21}H_{28}O_3$: C, 76.79; H, 8.59. Found: C, 76.04; H, 8.35.

This substance is a valuable diuretic agent and regulator of mineral metabolism and is accordingly useful in treating edema, and circulatory and cardiac conditions. It also exhibits gonadotropin inhibiting and central nervous system regulating activity.

*Example 4.—21-Fluoro-17α-Acetoxy-4-Pregnen-3,20-Dione (Va) (21-Fluoro-17α-Hydroxyprogesterone 17-Acetate) and 21-Fluoro-3,17α-Diacetoxy-3,5-Pregnadien-20-one (VIa)*

A mixture containing 0.5 gram of 21-fluoro-17α-hydroxy-4-pregnen-3,20-dione, 0.5 gram of para-toluenesulfonic acid monohydrate, twenty milliliters of acetic acid and seven milliliters of acetic anhydride was allowed to stand for a period of sixteen hours. The unreacted acetic anhydride was hydrolyzed by adding 125 milliliters of iced water while stirring and cooling. After one hour the reaction mixture was filtered and the precipitate washed with water, then dried. The dry residue was dissolved in methylene chloride and adsorbed on a column of thirty grams of Florisil. Elution with forty milliliter portions of a mixture composed of ten percent of acetone and ninety percent of Skellysolve B hexanes yielded two products. Fractions 4 and 5 weighed 172 milligrams and were combined and crystallized from methylene chloride-Skellysolve B to give 78 milligrams of 21-fluoro-3,17α-diacetoxy-3,5-pregnadien-20-one (VIa) with a melting point of 164 to 166 degrees centigrade. It has an infrared absorption spectrum consistent with this structure.

*Analysis.*—Calculated for $C_{25}H_{33}FO_5$: C, 69.42; H, 7.69. Found: C, 69.51; H, 7.78.

Fractions 10 to 15, inclusive, of the above chromatogram were pooled and crystallized from methylene chloride-Skellysolve B hexanes to give 380 milligrams of 21- fluoro-17α-acetoxy-4-pregnene-3,20-dione (V*a*) with a melting point of 232 to 234 degrees centigrade and a rotation of [α]$_D$ plus 57 degrees (in chloroform).

*Analysis.*—Calculated for $C_{23}H_{31}FO_4$: C, 70.74; H, 8.00; F, 4.87. Found: C, 70.83; H, 7.73; F, 4.76.

21-fluoro-17α-hydroxy-4-pregnene-3,20-dione is converted to other 21-fluoro-17α-acyloxy-4-pregnene-3,20-diones and 21-fluoro-3,17α-diacyloxy-3,5-pregnadien-20-ones by esterification of the 17α-hydroxyl and enol esterification of the 3-ketone by reaction with the appropriate acid, acid anhydride or acid halide in the presence of an acid catalyst such as paratoluenesulfonic acid or trifluoroacetic anhydride. In the same manner as in Example 4 but instead of employing acetic anhydride, substituting such acid anhydrides as propionic, butyric, isobutyric, valeric, enanthic, caproic, caprylic, benzoic, cyclopentylpropionic, phenylacetic, phenylpropionic, trimethylacetic, t-butylacetic, cyclopentylcarboxylic, ethylbutyric, o-toluic, dodecanoic or cyclohexylacetic is productive of 21-fluoro-17α-propionyloxy-4-pregnene-3,20-dione,
21-fluoro-3,17α-dipropionyloxy-3,5-pregnadien-20-one,
21-fluoro-17α-butyryloxy-4-pregnene-3,20-dione,
21-fluoro-3,17α-dibutyryloxy-3,5-pregnadien-20-one,
21-fluoro-17α-isobutyryloxy-4-pregnene-3,20-dione,
21-fluoro-3,17α-diisobutyryloxy-3,5-pregnadien-20-one,
21-fluoro-17α-valeryloxy-4-pregnene-3,20-dione,
21-fluoro-3,17α-divaleryloxy-3,5-pregnadien-20-one,
21-fluoro-17α-enanthoyloxy-4-pregnene-3,20-dione,
21-fluoro-3,17α-dienanthoyloxy-3,5-pregnadien-20-one,
21-fluoro-17α-caproyloxy-4-pregnene-3,20-dione,
21-fluoro-3,17α-dicaproyloxy-3,5-pregnadien-20-one,
21-fluoro-17α-capryloxy-4-pregnene-3,20-dione,
21-fluoro-3,17α-dicapryloxy-3,5-pregnadien-20-one,
21-fluoro-17α-benzoyloxy-4-pregnene-3,20-dione,
21-fluoro-3,17α-dibenzoyloxy-3,5-pregnadien-20-one,
21 - fluoro - 17α - cyclopentylpropionyloxy - 4 - pregnene-3,20-dione,
21 - fluoro - 3,17α - dicyclopentylpropionyloxy - 3,5 - pregnadien-20-one,
21-fluoro-17α-phenylacetoxy-4-pregnene-3,20-dione,
21-fluoro-3,17α-diphenylacetoxy-3,5-pregnadien-20-one,
21-fluoro-17α-phenylpropionyloxy-4-pregnene-3,20-dione,
21 - fluoro - 3,17α - diphenylpropionyloxy - 3,5 - pregnadien-20-one,
21-fluoro-17α-trimethylacetoxy-4-pregnene-3,20-dione,
21-fluoro-3,17α-ditrimethylacetoxy-3,5-pregnadien-20-one,
21-fluoro-17α-t-butylacetoxy-4-pregnene-3,20-dione,
21-fluoro-3,17α-di-t-butylacetoxy-3,5-pregnadien-20-one,
21 - fluoro - 17α - cyclopentylcarboxyloxy - 4 - pregnene- 3,20-dione,
21 - fluoro - 3,17α - dicyclopentylcarboxyloxy - 3,5 - pregnadien-20-one,
21-fluoro-17α-ethylbutyryloxy-4-pregnene-3,20-dione,
21-fluoro-3,17α-diethylbutyryloxy-3,5-pregnadien-20-one,
21-fluoro-17α-o-toluyloxy-4-pregnene-3,20-dione,
21-fluoro-3,17α-di-o-toluyloxy-3,5-pregnadien-20-one,
21-fluoro-17α-decanoyloxy-4-pregnene-3,20-dione,
21-fluoro-3,17α-didecanoyloxy-3,5-pregnadien-20-one,
21 - fluoro - 17α - cyclohexylacetoxy - 4 - pregnene - 3,20-dione, and
21 - fluoro - 3,17α - dicyclohexylacetoxy - 3,5 - pregnadien-20-one, respectively.

*Example 5.—17α,21-Dihydroxy-4,9(11)-Pregnadiene-3,20-Dione (Ib)*

38 grams of 17α,21-dihydroxy-4,9(11)-pregnadien-3,20-dione, 21-acetate (U.S. Patent 2,640,838) was dissolved in 7000 milliliters of methanol and 2600 milliliters of benzene and the solution purged of oxygen with nitrogen. Twenty grams of potassium bicarbonate in 200 milliliters of water was also purged with nitrogen and then added to the steroid with stirring. The reaction mixture was allowed to stand over a period of sixteen hours at room temperature. 35 milliliters of acetic acid was added and the mixture concentrated in vacuo to a volume of about 3500 milliliters, when solids separated. After cooling at five degrees centigrade, 21.8 grams of crystalline 17α,21-dihydroxy-4,9(11)-pregnadien-3,20-dione (I*b*) with a melting point of 241 to 243 degrees centigrade separated.

*Example 6.—21-Iodo-17α-Hydroxy-4,9(11)-Pregnadien-3,20-Dione (IIIb)*

A mixture containing 28.2 grams of 17α,21-dihydroxy-4,9(11)-pregnadien-3,20-dione and 300 milliliters of pyridine was cooled in an ice bath. Twenty milliliters of methanesulfonyl chloride was added with stirring to produce a homogeneous reaction mixture. The mixture was cooled for three hours then slowly diluted with one liter of water, which resulted in the precipitation of 17α,21-dihydroxy-4,9(11)-pregnadien-3,20-dione 21-methanesulfonate (II*b*). The product was filtered, washed with water and dried to give 30.4 grams.

29 grams of the above methanesulfonate was dissolved in 408 milliliters of acetone and thirty grams of sodium iodide in 258 milliliters of acetone was added. The resulting mixture was warmed under reflux for a period of fifteen minutes with stirring. 300 grams of ice and a solution of three grams of sodium thiosulfate in 780 milliliters of water were added. A precipitate formed which was filtered and dried to yield 27.5 grams of 21-iodo - 17α - hydroxy - 4,9(11) - pregnadien - 3,20 - dione (III*b*) with a melting point of 125 to 135 degrees centigrade (decomposition).

*Example 7.—21 - Fluoro - 17α - Hydroxy - 4,9(11)-Pregnadien-3,20-Dione (IVb)*

26.5 grams of 21-iodo-17α-hydroxy-4,9(11)-pregnadien-3,20-dione, dissolved in 2000 milliliters of acetonitrile, was warmed to forty degrees centigrade while being shielded from daylight. Three portions of seventeen milliliters each of a fifty percent aqueous silver fluoride solution were added at thirty minute intervals. The reaction mixture was warmed at forty degrees centigrade for an additional two hours and then filtered through Celite (diatomaceous filter aid). The filtrate was concentrated to a volume of 150 milliliters, 600 milliliters of water was added and the resulting mixture extracted with three 300 milliliter portions of methylene chloride. The pooled extracts were washed with water, dried over sodium sulfate and concentrated to dryness. The dry residue weighed eighteen grams and was dissolved in 500 milliliters of methylene chloride. This was poured onto a 500 gram column of Florisil and eluted with 1000 milliliter fractions, as follows:

Fractions 1 to 3   Acetone:Skellysolve B hexanes::9:91.
Fractions 4 to 7   Acetone:Skellysolve B::10:90.
Fractions 8 to 11  Acetone:Skellysolve B::12:88.
Fractions 12 to 15 Acetone:Skellysolve B::13:87.
Fractions 16 to 32 Acetone:Skellysolve B::15:85.

The combined fractions 24 to 32 were crystallized twice from methylethyl ketone to give 1.4 grams of 21-fluoro - 17α - hydroxy - 4,9(11) - pregnadiene-3,20-dione (IV*b*) with a melting point of 219 to 221 degrees centigrade and a rotation of [α]$_D$ of plus 120 degrees (in chloroform).

*Analysis.*—Calculated for $C_{21}H_{27}FO_3$: C, 72.80; H, 7.86; F, 5.48. Found: C, 72.82; H, 8.56; F, 4.7.

Chromatography was repeated on fractions 8 to 23 to give an additional 3.69 grams of 21-fluoro-17α-hydroxy-4,9(11)-pregnadiene-3,20-dione.

Fraction 3 was crystallized from methyl ethyl ketone to give 0.8 gram of 17α,21-epoxy-4,9(11)-pregnadien-3,20-dione with a melting point of 183 to 192 degrees centigrade. The infrared absorption spectrum indicated the absence of a hydroxyl group.

This substance is a valuable diuretic agent and regulator of mineral metabolism and is accordingly useful in treating edema, and circulatory and cardiac conditions. It also exhibits gonadotropin inhibiting and central nervous system regulating activity.

*Example 8.—21 - Fluoro - 17α - Acetoxy - 4,9(11)-Pregnadiene - 3,20 - Dione (Vb) 21 - Fluoro - 3,17α-Diacetoxy-3,5,9(11)-Pregnatrien-20-One (VIb)*

A solution containing 1.5 grams of 21-fluoro-17α-hydroxy-4,9(11)-pregnadiene-3,20-dione, 1.5 grams of paratoluenesulfonic acid monohydrate, ten milliliters of acetic anhydride and 45 milliliters of acetic acid was allowed to stand for a period of sixteen hours at 25 degrees centigrade. The excess anhydride was hydrolyzed by adding 300 milliliters of ice water while stirring and cooling. After one hour the reaction mixture was filtered and the precipitate washed with water and dried to give 1.4 grams of dry product. The dry residue was dissolved in fifteen milliliters of methylene chloride, fifteen milliliters of Skellysolve B was added and the solution adsorbed on a column of sixty grams of Florisil. The column was eluted with seventy milliliter portions of a mixture composed of ten percent of acetone and ninety percent of Skellysolve B hexanes.

Fractions 3 and 4 weighed 0.312 gram. The pooled product was dissolved in two milliliters of methylene chloride and 2.5 milliliters of Skellysolve B hexanes, concentrated and cooled to yield 240 milligrams of crystalline 21 - fluoro - 3, 17α - diacetoxy - 3,5,9(11) - pregnatrien-20-one (VIb), with a melting point of 182 to 185 degrees centigrade.

*Analysis.*—Calculated for $C_{25}H_{31}FO_5$: C, 69.74; H, 7.26. Found: C, 70.20; H, 7.38.

Fractions 6 to 10 weighed 0.90 gram and were pooled and crystallized from methylene chloride-Skellysolve B hexanes to give 0.77 gram of 21-fluoro-17α-acetoxy-4,9(11)-pregnadiene-3,20-dione (Vb), with a melting point of 218 to 220 degrees centigrade.

The infrared absorption spectrum showed the following maxima: 1717 centimeters$^{-1}$ (C=O of ester and ketone), 1662 centimeters$^{-1}$ (conjugated ketone), 1610 centimeters$^{-1}$ (conjugated C=C).

*Analysis.*—Calculated for $C_{23}H_{29}FO_4$: F, 4.89. Found: F, 5.02.

21 - fluoro - 17α - hydroxy - 4,9(11) - pregnadiene-3,20-dione is converted to other 21-fluoro-17α-acyloxy-4,9(11) - pregnadiene - 3,20-diones and 21 - fluoro-3,17α-diacyloxy-3,5,9(11)-pregnatrien-20-ones by esterification of the 17α-hydroxyl and enol esterification of the 3-ketone by reaction with the appropriate acid, acid anhydride or acid halide, in the presence of an acid catalyst such as paratoluenesulfonic acid or trifluoroacetic anhydride. In the same manner as in Example 8 but instead of employing acetic anhydride, the substitution of such acid anhydrides as propionic, butyric, isobutyric, valeric, enanthic, caproic, caprylic, benzoic, cyclopentylpropionic, phenylacetic, phenylpropionic, trimethylacetic, t-butylacetic, cyclopentylcarboxylic, ethylbutyric, o-toluic, dodecanoic or cyclohexylacetic is productive of 21-fluoro-17α-propionyloxy-4,9(11)-pregnadiene-3,20-dione,
21-fluoro-3,17α-dipropionyloxy-3,5,9(11)-pregnatrien-20-one,
21-fluoro-17α-butyryloxy-4,9(11)-pregnadiene-3,20-dione,
21-fluoro-3,17α-dibutyryloxy-3,5,9(11)-pregnatrien-20-one,
21-fluoro-17α-isobutyryloxy-4,9(11)-pregnadiene-3,20-dione,
21-fluoro-3,17α-diisobutyryloxy-3,5,9(11)-pregnatrien-20-one,
21-fluoro-17α-valeryloxy-4,9(11)-pregnadiene-3,20-dione
21-fluoro-3,17α-divaleryloxy-3,5,9(11)-pregnatrien-20-one,
21-fluoro-17α-enanthoyloxy-4,9(11)-pregnadiene-3,20-dione,
21-fluoro-3,17α-dienanthoyloxy-3,5,9(11)-pregnatrien-20-one,
21-fluoro-17α-caproyloxy-4,9(11)-pregnadiene-3,20-dione,
21-fluoro-3,17α-dicaproyloxy-3,5,9(11)-pregnatrien-20-one,
21-fluoro-17α-capryloxy-4,9(11)-pregnadiene-3,20-dione,
21-fluoro-3,17α-dicapryloxy-3,5,9(11)-pregnatrien-20-one,
21-fluoro-17α-benzoyloxy-4,9(11)-pregnadiene-3,20-dione,
21-fluoro-3,17α-dibenzoyloxy-3,5,9(11)-pregnatrien-20-one,
21-fluoro-17α-cyclopentylpropionyloxy-4,9(11) pregnadiene-3,20-dione,
21-fluoro-3,17α-dicyclopentylpropionyloxy-3,5,9(11)-pregnatrien-20-one,
21-fluoro-17α-phenylacetoxy-4,9(11)-pregnadiene-3,20-dione,
21-fluoro-3,17α-diphenylacetoxy-3,5,9(11)-pregnatrien-20-one,
21-fluoro-17α-phenylpropionyloxy-4,9(11)-pregnadiene-3,20-dione,
21-fluoro-3,17α-diphenylpropionyloxy-3,5,9(11)-pregnatrien-20-one,
21-fluoro-17α-trimethylacetoxy-4,9(11)-pregnadiene-3,20-dione,
21-fluoro-3,17α-ditrimethylacetoxy-3,5,9(11)-pregnatrien-20-one,
21-fluoro-17α-t-butylacetoxy-4,9(11)-pregnadiene-3,20-dione,
21-fluoro-3,17α-di-t-butylacetoxy-3,5,9(11)-pregnatrien-20-one,
21-fluoro-17α-cyclopentylcarboxyloxy-4,9(11)-pregnadiene-3,20-dione,
21-fluoro-3,17α-dicyclopentylcarboxyloxy-3,5,9(11)-pregnatrien-20-one,
21-fluoro-17α-ethylbutyryloxy-4,9(11)-pregnadiene-3,20-dione,
21-fluoro-3,17α-diethylbutyryloxy-3,5,9(11)-pregnatrien-20-one,
21-fluoro-17α-o-toluyloxy-4,9(11)-pregnadiene-3,20-dione,
21-fluoro-3,17α-di-o-toluyloxy-3,5,9(11)-pregnatrien-20-one,
21-fluoro-17α-decanoyloxy-4,9(11)-pregnadiene-3,20-dione,
21-fluoro-3,17α-didecanoyloxy-3,5,9(11)-pregnatrien-20-one,
21-fluoro-17α-cyclohexylacetoxy-4,9(11)-pregnadiene-3,20-dione, and
21-fluoro-3,17α-dicyclohexylacetoxy-3,5,9(11)-pregnatrien-20-one,
respectively.

It is to be understood that the invention is not to be limited to the exact details of operation or exact compounds shown and described, as obvious modifications and equivalents will be apparent to one skilled in the art to which this invention pertains, and the invention is therefore to be limited only by the scope of the appended claims.

We claim:
1. 21-fluoro-3,17α-disubstituted steroids of the following formula:
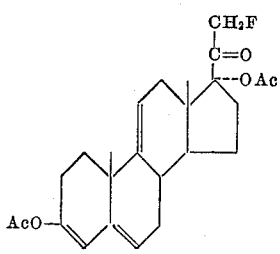
wherein Ac is an acyl radical of a hydrocarbon carboxylic acid containing from one to twelve carbon atoms, inclusive.
2. 21 - fluoro - 3,17α - diacetoxy - 3,5(9)11-pregnatrien-20-one.
References Cited in the file of this patent
UNITED STATES PATENTS
| | | |
|---|---|---|
| 2,668,816 | Miescher et al. | Feb. 9, 1954 |
| 2,763,671 | Fried et al. | Sept. 18, 1956 |
| 2,822,318 | Kroll et al. | Feb. 4, 1958 |
| 2,867,631 | Lincoln | Jan. 6, 1959 |